United States Patent [19]

Hoppe et al.

[11] Patent Number: 5,378,826
[45] Date of Patent: Jan. 3, 1995

[54] PROCESS FOR THE PREPARATION OF A STORAGE STABLE LOW ESTERIFIED NITROCELLULOSE MOISTENED WITH ALCOHOL OR WATER

[75] Inventors: Lutz Hoppe; Bernd Haase; Oke Brauer; Klaus Szablikowski, all of Walsrode, Germany

[73] Assignee: Wolff Walsrode AG, Walsrode, Germany

[21] Appl. No.: 98,674

[22] Filed: Jul. 28, 1993

[30] Foreign Application Priority Data

Aug. 4, 1992 [DE] Germany .................... 4225761

[51] Int. Cl.⁶ .................... C08B 5/02; C08B 5/04
[52] U.S. Cl. .................... 536/35; 536/38; 536/39; 536/124
[58] Field of Search .................... 536/35, 38, 39, 124

[56] References Cited

U.S. PATENT DOCUMENTS

3,057,012 10/1962 Lufkin .................... 536/39

FOREIGN PATENT DOCUMENTS

0084153 7/1983 European Pat. Off. .
1063506 8/1959 Germany .
871299 6/1961 United Kingdom .

*Primary Examiner*—Nathan M. Nutter
*Attorney, Agent, or Firm*—Sprung Horn Kramer & Woods

[57] ABSTRACT

The present invention relates to a process for the preparation of nitrocellulose having particular properties by compression by means of contrarotating rollers.

5 Claims, No Drawings

PROCESS FOR THE PREPARATION OF A STORAGE STABLE LOW ESTERIFIED NITROCELLULOSE MOISTENED WITH ALCOHOL OR WATER

The present invention relates to a process for the preparation of nitrocellulose having particular properties by compression by means of contrarotating rollers.

Low esterified nitrocelluloses having a nitrogen content of up to 12.6%, which are used predominantly in the lacquer industry, are produced by the esterification of celluloses with nitrating acids which usually consist of a mixture of nitric acid, sulphuric acid and water.

After the nitrating acid has been removed, in most cases by intensive washing with water, and the nitrocelluose has been adjusted to the desired molar mass by a process of thermal degradation, the nitrocellulose thus obtained, which is of a fibrous structure, must be phlegmatized to avoid ignition. A wide variety of phlegmatizing agents is used for this purpose.

The most commonly used method, apart from the addition of plasticizers, is the moistening of nitrocellulose with alcohols and/or water. Nitrocelluloses are conventionally brought on the market with moisture contents of alcohol and/or water of from 30 to 35%. If the degree of moisture is below 25%, these low esterified nitrocelluloses must be treated as "explosive substances" due to the high hazard potential (Annexe A to the Gefahrgutverordnung Strasse/to ARD BI-Anl.1 (Hazardous Chemical Regulation/ to ARD B I-Annexe 1.2). In spite of this phlegmatization, low esterified nitrocelluloses which are stored and transported in drums or cardboard boxes still constitute a certain hazard.

A process is known for treating fibrous nitrocelluloses to make them safer for transport and storage (GB PS 871 299). In this process, a compressive force of $P = 2M + 6400$ is exerted on the moist fibrous nitrocellulose, where P is the force in pounds per square inch and M is the mean length of fibers of the nitrocellulose in microns. The force is applied by two contrarotating rollers operating in close contact with one another.

If the nitrocellulose treated as described above and, for comparison, untreated fibrous nitrocellulose, in both cases moistened with 30% isopropanol, are introduced into steel drums and ignited, the treated material should only partly burn with a mild flame whereas the untreated material breaks out into vigorous flames after only 1/12 minutes, and the flames must be extinguished.

This known process has, however, the disadvantage that in spite of the recommended treatment, the moistened fibrous nitrocellulose stored in its packaging container, i.e. a drum or a cardboard box, separates into its components after 2 to 6 weeks, which is a quite usual storage time. The alcohol and/or water used as moistening agent sinks to the bottom region so that the fibrous nitrocellulose dries out to an unacceptable extent in the upper region of the package.

The "Sprengstofflager Richtlinien" (guidelines for storage of explosives) [Publication of BMA of Jul. 8, 1991-IIIb4-35205-10 in the Bundesarbeitsblatt 11/1991, page 43, Point 4.3 (3)] therefore recommend regular turning of the packages as a suitable countermeasure against separation. The instruction sheet of the Berufsgenossenschaft der chemischen Industrie (Professional Association of the Chemical Industry) (MO37 4/84 page 6) recommends turning of the storage containers at intervals of 14 days to prevent the hazard caused by drying out of the layers. This entails a very great and uneconomical expenditure of labour.

One reason why the no doubt advantageous measure of compressing fibrous nitrocellulose has only a limited effect in preventing the nitrocellulose from drying out in the upper part of the package is that in order to obtain a high degree of filling in the package, the nitrocellulose is in addition rammed into the package, with the result that the compacted material is partly destroyed.

A process by which storage stable low esterified nitrocellulose moistened with alcohols and/or water are prepared by compression by means of contrarotating rollers has now been found, which is characterized in that while a linear pressure of from 0.2 to 10 t/m is applied between the rollers acting on the fibrous nitrocellulose and the ratio of the speeds of rotation of the two rollers is from 1:1.1 to 1:3, the friction between the two rollers is adjusted to a value resulting in a difference in the power consumption of the two rollers of from 5 to 100 watt per kg of nitrocellulose.

The linear pressure between the rollers is preferably from 0.6 to 8 t/m. It has been found advantageous in the process according to the invention to remove the heat of friction by means of a cooling medium flowing through the rollers.

The drying out of nitrocelluose, which is due to separation of the moistening agent in the package and which is so dangerous for storage and transport as well as for subsequent processing, can be almost completely eliminated by the process according to the invention.

Even in the case of highly viscous, long fiber types of nitrocellulose, which have a particular tendency to rapid separation, especially inside tall packages, no significant loss of moisture from the nitrocellulose layers in the package could be ascertained after the treatment of nitrocellulose carried out by the process according to the invention.

Another advantage, which is not to be underestimated, is that the nitrocellulose produced by the process according to the invention has a free flowing consistency which considerably facilitates emptying of the packages.

If it was necessary in the past to ram the nitrocellulose into the packages in order to obtain economical filling weights, the nitrocellulose produced by the process according to the invention can be introduced into the packages without any additional ramming and yet even higher filling weights can be achieved than for rammed nitrocellulose.

The following Examples illustrate the influence of the treatment of the nitrocellulose by the process according to the invention on the moisture loss of nitrocellulose in the packages, which is so important from a safety point of view (percentages are percentages by weight).

EXAMPLES

Example 1

200 kg/h of nitrocellulose moistened with 36% of isopropanol were applied to a pair of rollers 380 mm in diameter and 200 mm in length driven in contrarotation. The contact pressure in the necks of the rollers was in each case 40 t. The speeds of rotation of the two rollers were adjusted so that the Dower consumption of the more rapidly rotating roller was 14 KW and that of the slower roller was 5 KW. This corresponds to a difference in power consumption of 45 Watt/kg of nitrocellulose.

The nitrocellulose left the rollers in the form of a very homogeneous compressed sheet- which was subsequently broken up into pieces of about 0.5 to 3 cm. No fibrous structure could be seen on the surfaces of these pieces. The pieces were filled into cylindrical packages 46 cm in diameter and 86 cm in height. The packages, which were filled to the top, were tightly sealed. The isopropanol content of the nitrocellulose in the packages was 34.5%.

Samples were removed at intervals of three weeks from the packages, which were stored in an upright position. After 12 weeks, the isopropanol content in the upper layers of the package was 33.8%, and even after 18 weeks the isopropanol content was still found to be 33,6%, which shows that the upper layers of nitrocellulose in the package did not suffer moisture loss to any extent which could significantly affect the safety.

Example 2

The speeds of the rollers were regulated as in Example 1 to adjust the power consumption of the two rollers to 8 and 7.5 KW, respectively. This corresponds to a difference in power consumption of the two rollers of 2.5 Watt/kg of nitrocellulose. Here again, the nitrocellulose left the pair of rollers in the form of a sheet which was homogeneous in appearance. This sheet was broken up into pieces as in Example 1 and filled into its packaging containers. The pieces had an isopropanol content of 35.5%. In the samples removed as in Example 1, the isopropanol content in the upper layers of the package was found to be reduced to 33.6% after only 2 weeks and to 30.2% after 8 weeks. The isopropanol content had fallen below the critical value of 25% after 14 weeks.

In a parallel experiment carried out with an uncompressed nitrocellulose, the critical value of 25% of isopropanol was reached after only 6 weeks.

We claim:

1. In the preparation of a storage stable nitrocellulose comprising the steps of reacting cellulose with a nitrating agent to obtain a fibrous nitrocellulose having a nitrogen content of up to about 12.6%, moistening such nitrocellulose with at least one of alcohol and water and compressing said moistened nitrocellulose between two rollers to a content of alcohol plus water of at least about 25%, the improvement which comprises effecting said compression with a linear pressure of from 0.2 to 10 t/cm between the rollers acting on the fibrous nitrocellulose, the friction between the rollers being adjusted to a value resulting in a difference in the power consumption of the two rollers of from 5 to 100 Watt/kg of nitrocellulose.

2. A process according to claim 1, wherein the compression between the rollers produces heat of friction, the process including the further step of removing the heat of friction by passing a cooling medium through the rollers.

3. A process according to claim 1, wherein the rollers have different diameters.

4. A process according to claim 1, wherein the linear pressure between the rollers is from 0.6 to 8 t/m.

5. Nitrocellulose produced by the process of claim 1.

* * * * *